O. G. GULLBRANDSSON.
BALL CAGE FOR BALL BEARINGS.
APPLICATION FILED AUG. 28, 1920.

1,362,097.

Patented Dec. 14, 1920.

Inventor
O. G. Gulbrandsson,
By H. R. Kerslake.
Attorney

UNITED STATES PATENT OFFICE.

OLOF GUSTAF GULLBRANDSSON, OF GOTTENBORG, SWEDEN, ASSIGNOR TO NORDISKA KULLAGER AKTIEBOLAGET, OF REGULUSGATAN, LUNDBY, GOTTENBORG, SWEDEN.

BALL-CAGE FOR BALL-BEARINGS.

1,362,097.        Specification of Letters Patent.        Patented Dec. 14, 1920.

Application filed August 28, 1920. Serial No. 406,575.

*To all whom it may concern:*

Be it known that I, OLOF GUSTAF GULLBRANDSSON, a subject of the King of Sweden, residing at Gottenborg, in the county of Gottenborg and Bohus and Kingdom of Sweden, have invented new and useful Ball-Cages for Ball-Bearings, of which the following is a specification.

This invention relates to ball cages in especially such ball bearings, which include merely a single set of balls.

The object of the invention is to provide a ball cage for supporting the balls with a minimum amount of space between the same and so that they are firmly guided on distinct spaces.

In carrying out my invention I provide a metal wire, wound to a closed ring, embracing the whole circle of the race and having a series of angular bent loops, located in position between two adjacent balls, whereby the outer ends of these loops are further bent so that they embrace the balls.

Figure 1:
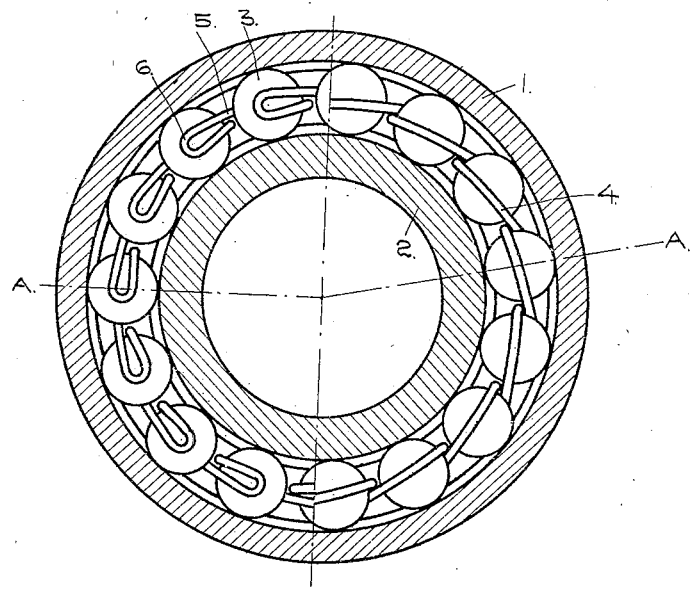
Figure 2:
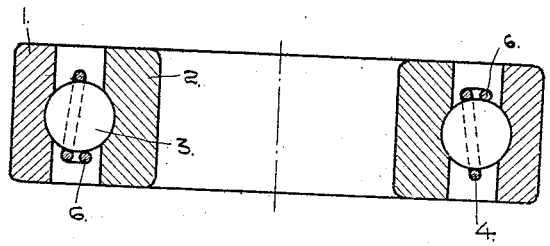
Figure 3:
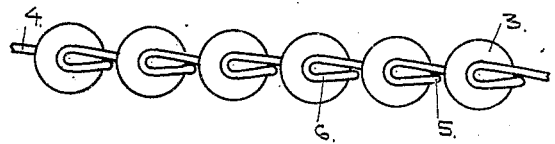

In the accompanying drawing Figure 1 is a side view partly in section of a journal bearing equipped with the present improvement. Fig. 2 is a sectional view taken on a plane at about the line A—A of Fig. 1, and Fig. 3 is an edge view of a portion of the cage with balls in position.

The ball bearing consists in usual manner of an outer ring 1 and an inner ring 2 with balls 3 inserted between them, the balls being separated by a cage. The cage consists of a metal wire 4 of a suitable thickness, wound to a closed circle, embracing the whole race. In accordance with this invention the wire 4 is provided with angular bent loops 5, so located that they constitute each a convenient support for two adjacent balls. The outer ends of these loops are then further bent in such a way, that they form arms each lying in a plane perpendicular or nearly perpendicular to the plane, in which the wire-portion lying between the balls is located.

It will be understood that the cage may be constructed in different ways and that the cage illustrated is merely chosen as an example of my invention. Thus changes in details may be made within the scope of the claim without departing from the spirit of my invention.

I am aware that it has been previously proposed to use ball cages of helical wire springs with loops for receiving the balls, and I do not claim to be the inventor of such devices, but having now described my said invention, what I claim as new and want to protect by Letters Patent is—

1. The combination with a series of balls, of a cage for the same formed of a single length of wire bent into ring shape and formed into retaining loops disposed at spaced points along its length, the axes of said loops being radially arranged relatively to the axis of the ring, and the sides of each of said loops engaging opposite sides of one of the balls.

2. The combination with a series of balls, of a cage for the same formed of a single length of wire of ring shape bent into loops disposed at spaced points along its length, each loop being formed of an eye-shaped part engaging one side of a ball and a substantially straight part engaging the opposite side of the ball, the axis of said eye-shaped part extended parallel to the axis of the ring, and the axes of said loops being arranged radially relatively to the axis of the ring.

In testimony whereof I have affixed my signature.

OLOF GUSTAF GULLBRANDSSON.